Jan. 16, 1962 W. G. DILWORTH 3,017,229
BEARING LUBRICATION MEANS
Filed Dec. 11, 1958 2 Sheets-Sheet 1
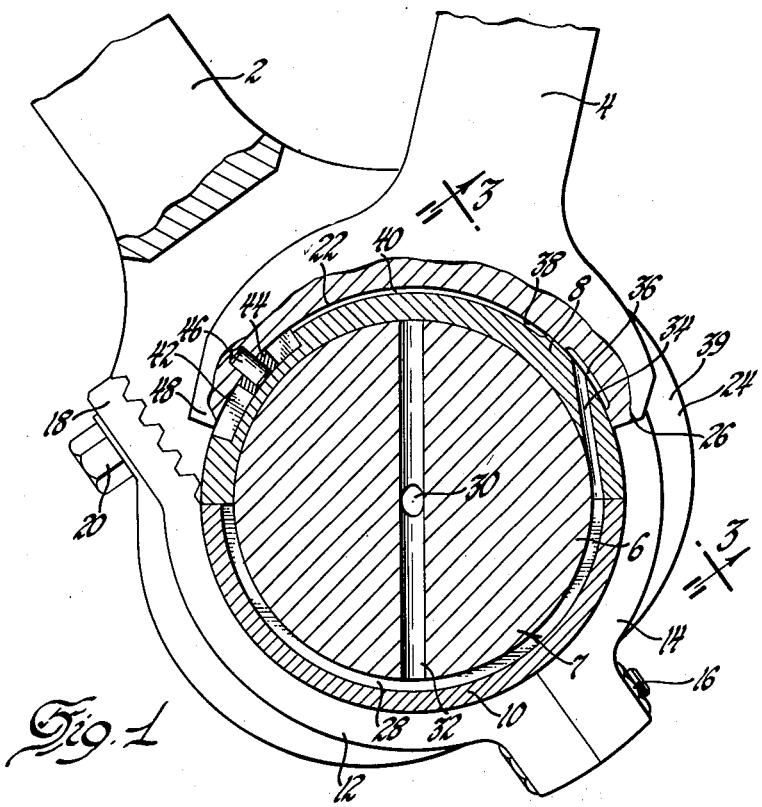
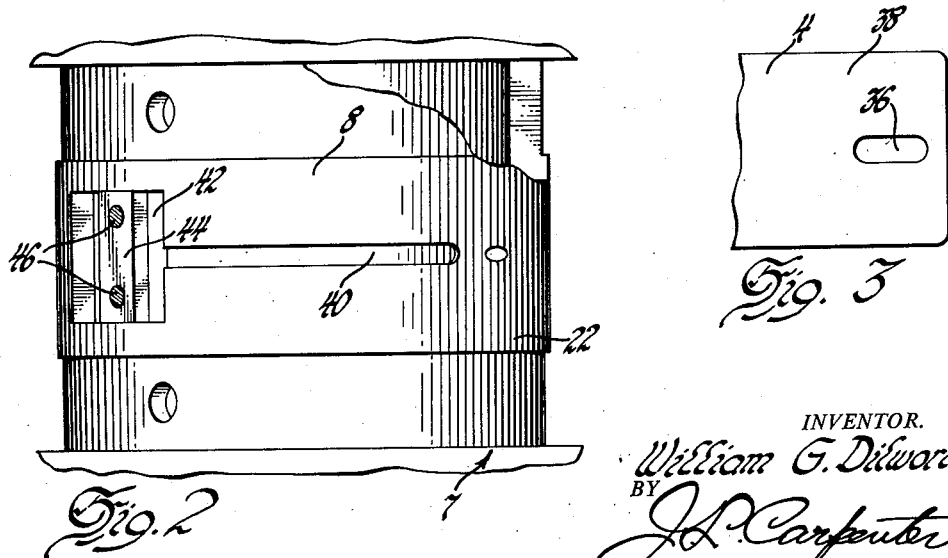
INVENTOR.
William G. Dilworth
BY
J. L. Carpenter
ATTORNEY Jan. 16, 1962 W. G. DILWORTH 3,017,229
BEARING LUBRICATION MEANS
Filed Dec. 11, 1958 2 Sheets-Sheet 2

INVENTOR.
William G. Dilworth
BY
J. L. Carpenter
ATTORNEY

United States Patent Office 3,017,229
Patented Jan. 16, 1962

3,017,229
BEARING LUBRICATION MEANS
William G. Dilworth, La Grange, Ill., assignor to General Motors Corporation, Detroit, Mich., a corporation of Delaware
Filed Dec. 11, 1958, Ser. No. 779,646
1 Claim. (Cl. 308—122)

This invention relates generally to bearing members and particularly to means for lubricating the bearing surfaces of such members. The invention specifically concerns the lubrication of reciprocable bearing surfaces.

It is broadly a primary object of this invention to provide lubrication means which responds to the relative movement between a pair of reciprocable bearing members to positively apply lubricant to the bearing surfaces between such members.

It is a further object of the invention to provide lubricating means between a pair of radial reciprocating bearing surfaces which comprises a pump built between the radial bearing surfaces of such members and which responds to the relative movement between these members to positively supply lubricant to such surfaces.

It is a still further object of the invention to provide lubricating means for bearing surfaces between a pair of radial reciprocating bearings in which a pump assembly has a part thereof built into one of the members and a pump element associated therewith on the other of the members so that said pump is operated by the relative reciprocating movement between the two members.

For the above and further objects of this invention, reference may be made to the accompanying detailed description and drawings in which:

FIGURE 1 is a view in elevation of a crankshaft and connecting rod assembly with the unique lubricating means shown acting to lubricate a slipper bearing surface of a blade connecting rod and the outer bearing surface of the bearing shell about a crank throw.

FIGURE 2 is a view of the connecting rod upper bearing on which the slipper bearing of the blade rod of the connecting rod assembly movably bears.

FIGURE 3 is a view taken on the line 3—3 of FIGURE 1 illustrating the recess in the blade rod which connects with the pump assembly to the lubricant source via passageways and ports in both bearing members.

Figure 4:
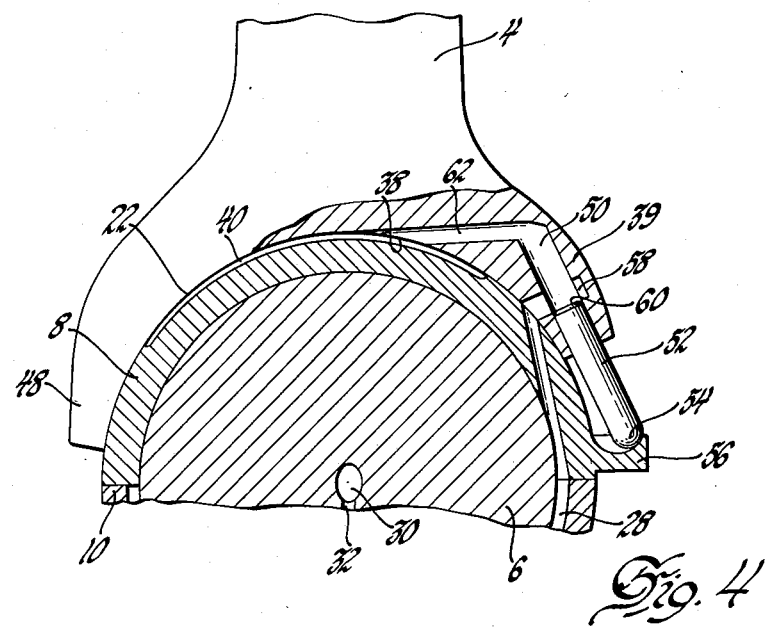
FIGURE 4 shows a second form of the invention wherein the lubricating pump means is primarily built into the blade rod of the connecting rod assembly and the plunger of the pump means is shown in one of its two extreme positions.

Referring first to FIGURES 1, 2 and 3, a connecting rod and crankshaft assembly is shown which includes a main fork rod 2 and a blade rod 4. One crank throw 6 of a crankshaft 7 is shown which has journaled thereon a connecting rod upper bearing shell 8 and a lower bearing shell 10. The crank throw 6 of the crankshaft is journaled for rotation in the upper and lower bearings 8 and 10 which are fixed to the fork connecting rod 2 by a basket assembly comprising the basket members 12 and 14 bolted together at their lower ends by bolt and nut assembly 16 and at their upper ends 18 to rod 2 by studs 20. The blade rod 4 movably bears against the outer bearing surface 22 of the upper bearing 8 and is retained thereagainst by a shoulder or flange 24 engaging a co-operating flange or shoulder 26 on the end of blade rod 4. A groove 28 is provided in the lower bearing 10 to which oil may be supplied from a lubricant source via the axially extending passageway 30 and transverse passageway 32. Connected to the groove 28 is a passageway 34 in upper bearing 8 which leads to the outer bearing surface 22 of bearing 8 and to a recess 36 in the bearing surface 38 at one end 39 of blade rod 4. The upper bearing 8 is also provided with a groove 40 in its outer surface which is adapted to be connected to the passageway 34 by recess 36 for certain positions of blade rod 4 with respect to bearing 8. The groove 40 leads to a recess 42 also in the outer bearing surface 22 of bearing 8. Residing in the recess 42 for movement back and forth therein is a small pump plunger 44 which is fixed by a pin or stud 46 to the opposite end 48 of blade rod 4. The operation of the lubrication means is as follows:

As the crankshaft rotates and the crank throw 6 rotates within the upper and lower bearings 8 and 10, the blade rod 4 will move in an oscillatory manner on the outer surface 22. As the blade rod 4 moves counterclockwise so that plunger 44 moves downwardly and to the left as viewed in FIGURE 1, a vacuum will be created in the recess 42 causing oil to flow from the lubricant source through the passageways 30, 32, through groove 28, passageway 34 into recess 36 and, when recess 36 spans the passageway 34 and groove 40, through groove 40 to recess 42. As the movement of the blade rod 4 changes from counterclockwise to clockwise movement as viewed in FIGURE 1, the plunger 44 will then force the oil in recess 42 back through groove 40 and between the bearing surfaces 22 and 38 thereby lubricating these surfaces.

It will thus be seen that the present invention utilizes the relative movement between the bearing surfaces to pump lubricant between these surfaces with the pumping means actually being built between the two bearing surfaces. The lubricant means illustrated and described assures positive lubrication of the bearing surfaces between the blade rod and the upper bearing at all times.

Figure 5:
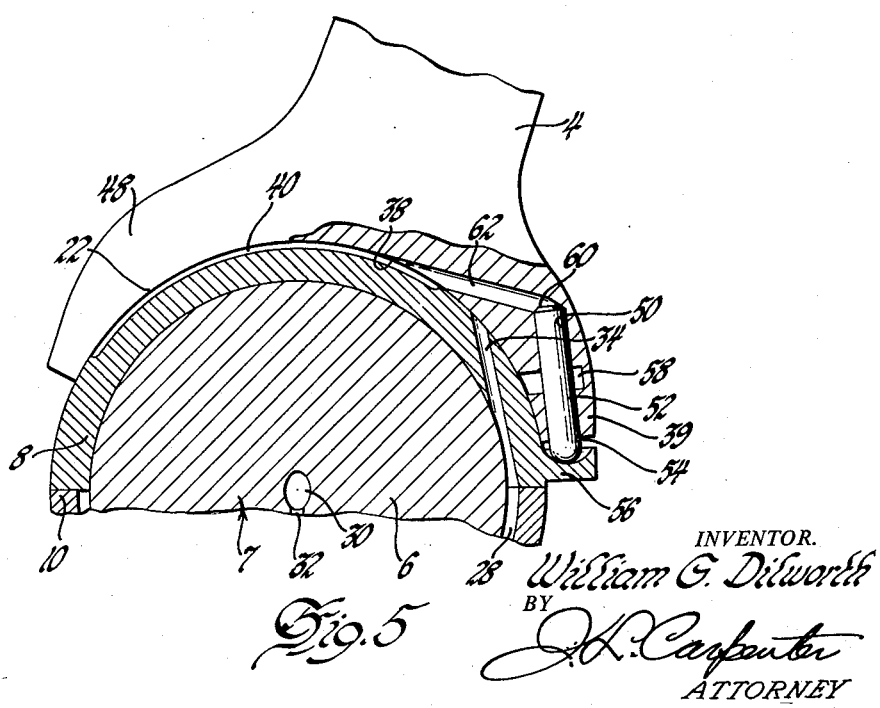
FIGURE 5 is a view similar to that of FIGURE 4 but with the plunger of the pump in the other of its extreme positions.

A second form of the invention is shown in FIGURES 4 and 5 and again comprises the blade rod 4 which is journaled for movement back and forth on the bearing 8. In this instance, however, in the end 39 of blade rod 4 there is provided a cylindrical bore 50 in which is movably housed a piston plunger 52. The plunger 52 has its lower end 54 movably supported by a projection 56 secured to or made a part of the upper bearing shell 8. Passageway 34 communicates with a chamber 58 immediately before the end 60 of plunger 52 when shown in its lower limiting position as indicated in FIGURE 4. The bore 50 has connected thereto a passageway 62 which also communicates with the groove 40 and upper bearing 8. The lubrication of the bearings of FIGURES 4 and 5 operates as follows:

As the blade 4 oscillates back and forth on the bearing 8, the plunger 52 is caused to reciprocate in the bore 50. As the plunger 52 moves downwardly to the position shown in FIGURE 4, oil may flow into the chamber 58 in front of the piston 52. As the rod 4 moves clockwise, the plunger 52 moves upwardly into the bore 50 causing oil to be forced through the passageway 62 into groove 40 and between the bearing surfaces 22 and 38, thereby lubricating these two bearing surfaces.

Again it will be appreciated that a simple but very effective lubricating pump means has been provided which is built right into the two bearing members and which utilizes the relative movement therebetween to operate the pump and force the lubricant between the bearing surfaces.

I claim:

In combination with a pair of relatively oscillating members having cooperating surfaces thereon, means for lubrication of said surfaces comprising a pump recess in one of said surfaces in communication with said surfaces, a pump element secured to the other of said surfaces and movable back and forth in said recess by the relative movement between said members, and means for connection of said recess to a lubricant supply passage, one of said members having a passageway in communication with one end of said pump recess, the other of said members having another passageway adapted to be connected to said supply passage, one of said members having a cavity in the surface thereof adapted to alternately connect and disconnect said other passageway in response to the relative movement of said members.

References Cited in the file of this patent

UNITED STATES PATENTS

| | | |
|---|---|---|
| 1,500,355 | Yeager | July 8, 1924 |
| 2,629,639 | Johansen | Feb. 24, 1953 |